ADDITION OF WAVETRAINS TO FORM PHASE REVERSAL

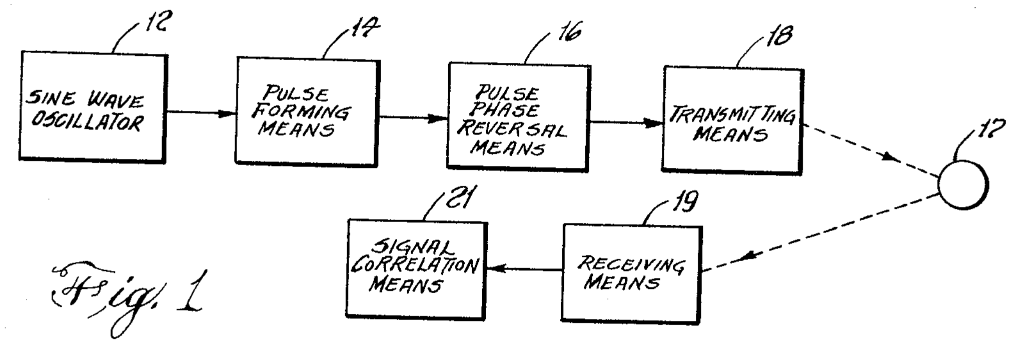
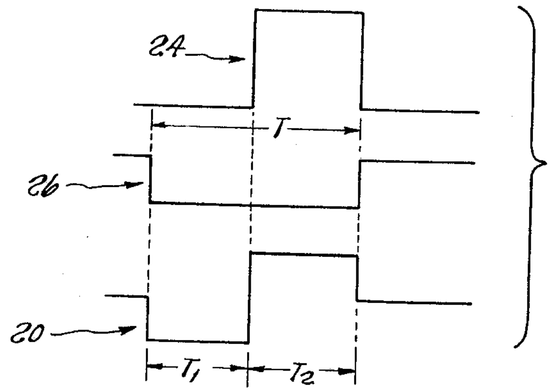
Fig. 2a
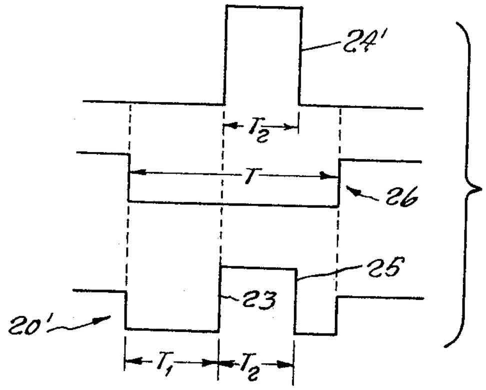
Fig. 2b
INVENTOR.
NORMAN W. LORD
BY Philip Schneider
Lon B. Cygglet...
ATTORNEYS

INVENTOR.
NORMAN W. LORD
BY Philip Schneider
Lon B. Appleton
ATTORNEYS

INVENTOR.
NORMAN W. LORD
BY Philip Schneider
Louis B. Applebaum
ATTORNEYS

INVENTOR.
NORMAN W. LORD
BY Philip Schneider
Louis B. Applebaum
ATTORNEYS

Dec. 26, 1967 N. W. LORD 3,360,769

METHOD AND MEANS FOR GENERATING AND ANALYZING SPECIAL WAVEFORM SIGNALS OF HIGH INFORMATION CONTENT

Filed March 29, 1967 7 Sheets-Sheet 5

INVENTOR.
NORMAN W. LORD
BY Philip Schneider
Louis B. Applebaum
ATTORNEYS

INVENTOR
NORMAN W. LORD
BY Philip Schneider
Leon D. Applebaum
ATTORNEYS

INVENTOR.
NORMAN W. LORD
BY Philip Schneider
Louis B. Applebaum
ATTORNEYS

United States Patent Office 3,360,769
Patented Dec. 26, 1967

3,360,769

METHOD AND MEANS FOR GENERATING AND ANALYZING SPECIAL WAVEFORM SIGNALS OF HIGH INFORMATION CONTENT

Norman W. Lord, Yonkers, N.Y., assignor to Columbia University, New York, N.Y., a corporation of New York Filed Mar. 29, 1967, Ser. No. 627,589
9 Claims. (Cl. 340—3)

ABSTRACT OF THE DISCLOSURE

A method and means for providing at least one phase reversal within a pulse of oscillatory energy. A second pulse of shorter duration and of greater amplitude, occurring within the durational period of the first, is added to the first pulse. The second pulse can be as short as a single wave of the oscillatory energy and should be an integral number of wavelengths. A ranging pulse which contains an interior phase reversal provides an echo which is easily identifiable through noise signals by the use of common signal correlation techniques.

This application is a continuation-in-part of my original, now abandoned application, Ser. No. 451,674, filed Apr. 28, 1965, assigned to the same assignee as the instant application.

This invention relates to the transmission and reception of oscillatory mechanical or electromagnetic energy through a noisy propagation medium of heterogeneous physical properties and especially to a method and means for generating and analyzing a class of waveforms that contain closely spaced informational events.

In communicating between spaced locations in a heterogeneous, unstable, noisy medium, several considerations are involved. First, the signal in such a medium travels to its destination over a continuous distribution of different paths which differ slightly in propagation time, so that the original oscillations when reconstituted at the receptor present a drastically distorted waveform. Secondly the medium may itself contain sources of random noise so that the signals of interest become obscured in the presence of noise signals. The exemplary medium most relevant to the invention is the ocean which contains continuous distributions of as well as localized noise sources. Thirdly the medium may be temporally unstable so that even those waveform distortions that occur will themselves change for energy transmitted at a later time. Again, as an example, the ocean medium has precisely this character by virtue of its continuous non-uniform motion.

These characteristics of the medium make identification of signal waveforms transmitted through a heterogeneous, noisy, unstable medium such as the ocean quite difficult, even when the received signals are closely correlated against a master record of the waveform of the transmitted signal. In particular, a need exists for a system which will permit the easy recognition of an oscillatory acoustic pulse of energy that has been transmitted through the ocean. Such pulses are used in sonar, the scientific investigation of the properties of the ocean, acoustic geodesy, and to carry control and measurement information to and from remotely operated devices.

The object and advantages of the present invention are accomplished by introducing, as informational events, $\pi$-radian phase changes, i.e. reversals, in the interior of transmitted carrier pulses. These pulses consist, in one example, of a short series of sinewaves with phase reversal in the center (for optimum identification) if only one event is desired. If more than one even is desired the phase reversals are spaced closely in the interior of the pulse but are separately detected by cross-correlating the received pulse with atruncated replica, that is, a replica which is derived from a specific 1-cycle interval of the pulse and includes a phase reversal. The description herein will concern itself with an acoustic pulse or set of pulses transmitted through an oceanic medium, although it is to be noted that the invention is not to be limited thereto, being capable of extension to the transmission of electromagnetic pulses in an electromagnetic medium, for example.

An object of the invention is to provide easily identifiable events in the interior of a signal transmitted through a heterogeneous, noisy, unstable medium.

Another object is to provide easily identifiable events in a pulse signal consisting of a short series of sine waves, which pulse is transmitted through a heterogeneous, noisy, unstable medium.

Other objects and many of the attendant advantages of this invention will be readily appreciated as the same becomes better understood by reference to the following detailed description when considered in connection with the accompanying drawings wherein:

FIG. 1 is a block diagram of the invention;

FIG. 2*a* is an illustration of the formation of a pulse with a single phase reversal at a selected point any place in the interior of the pulse.

FIG. 2*b* is an illustration of the formation of a pulse carrying two phase reversal at selectable interior points.

FIG. 3*a* is an illustration of the same process shown in FIG. 2*a* except that sine waves are used instead of the pulse envelope. Here $T_2=T_1$ and the single phase reversal is in the center.

FIG. 3*b* is an illustration of the carrier pulse when it carries two phase reversals of mutually opposite sign, the latter being produced by shortening $T_2$ to one cycle;

Figure 7A:
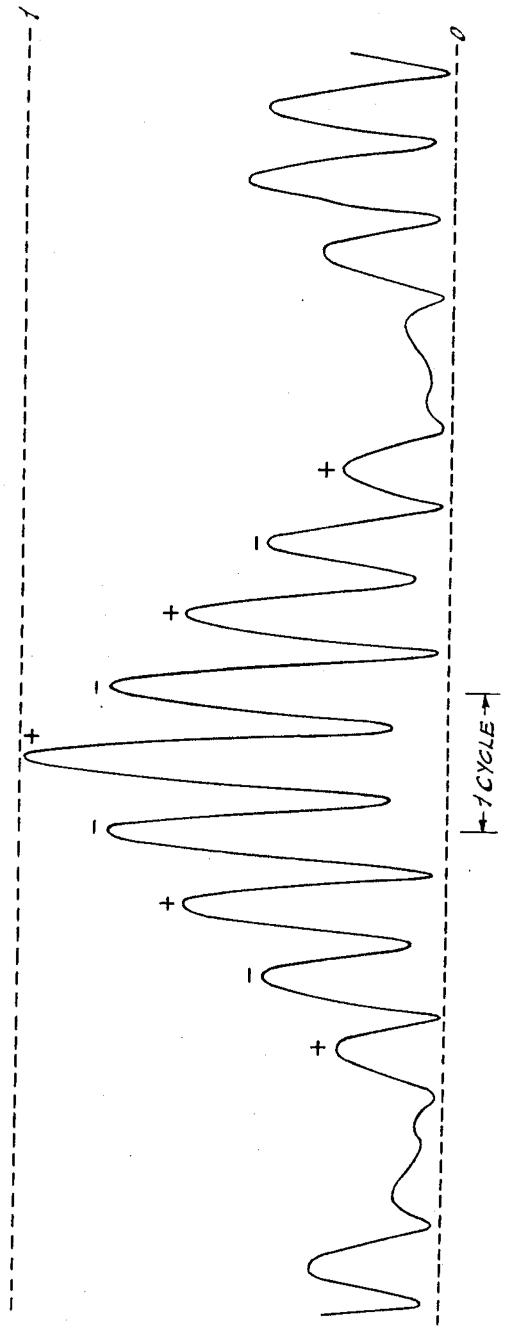
Figure 7B:
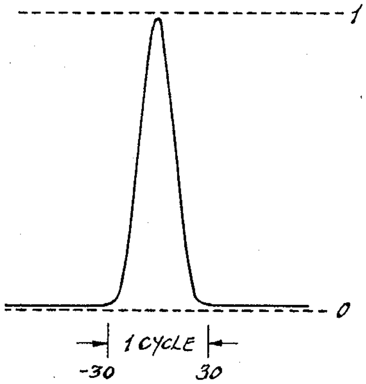
Figure 8:
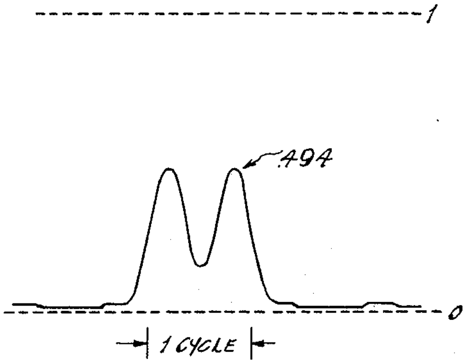

FIG. 7*a* is a waveform showing the correlation of a phase reversed pulse with itself as a replica (cross-covariance). The vertical scale is arbitrarily taken from zero to one; the horizontal scale is a time scale. Polarities are indicated for the central peaks;

FIG. 7*b* is a waveform showing the correlation of a phase reversed pulse with a truncated replica of itself, the truncation taking place symmetrically about a phase reversal point. Note that the replica for this figure consists of only half a cycle on each side of the phase reversal instant;

FIG. 8 is a waveform showing full resolution by truncated replica of two superposed signals mutually time displaced the equivalent of 0.64 cycle of the fundamental frequency.

Figure 9:
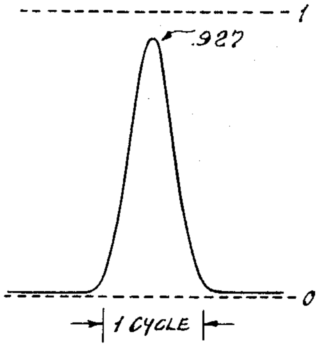

FIG. 9 is a waveform showing departure from unity of peak cross-correlation truncated replica with a superposition of a continuum of signals uniformly time-distributed over 0.5 cycle of the fundamental frequency.

Figure 3A:
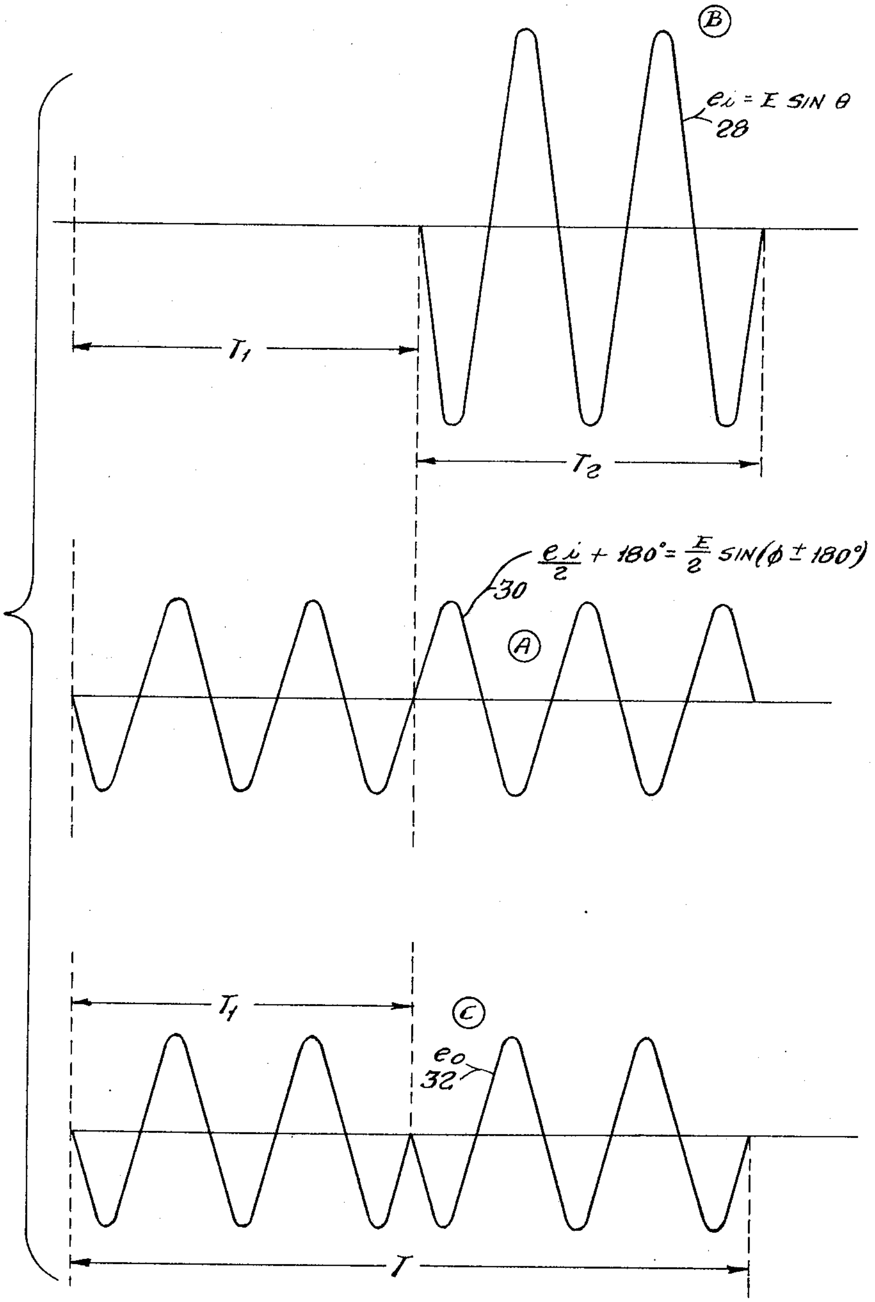
Figure 3B:
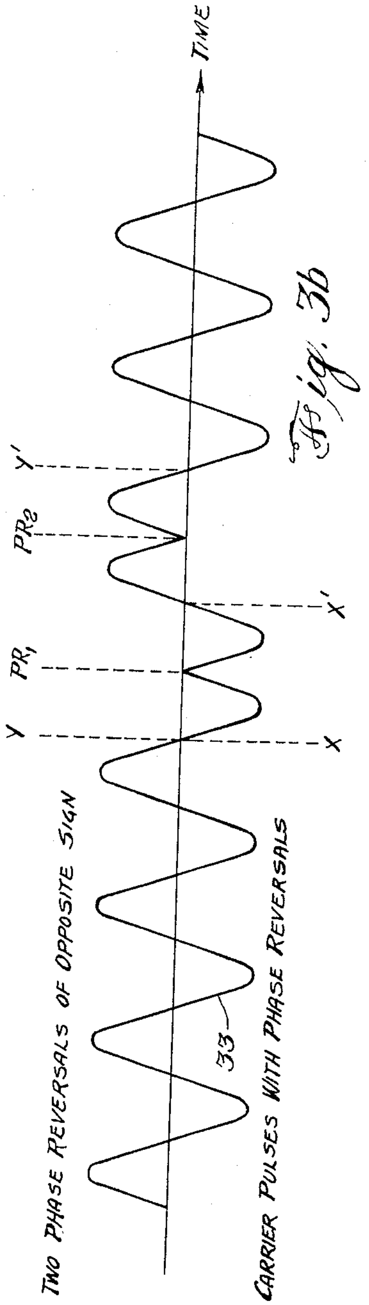
Figure 10:
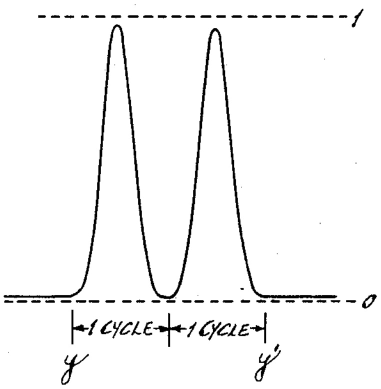

FIG. 10 are waveforms showing the correlation with a truncated replica of a carrier pulse with two phase reversals such as shown in FIG. 3*b*.

A carrier pulse of oscillatory energy that has been transmitted through a heterogeneous, noisy medium is spread out over a distribution of transmission paths and its waveform, when reconstituted at a receptor, is thereby distorted. It also tends to become obscured by the noise of the medium. One method which has been resorted to for identifying received pulses is to correlate them against a replica of the original transmitted pulse. This correlation, the results of which are shown for several examples of digitized waveforms in FIGS. 7 through 10, proceeds as follows:

Let $V(t)$ be the signal voltage, $V_1$ at time $t$.

$VR(t+\tau)$ be the replica voltage at a time displaced from $t$ by $\tau$.

Then the correlation $N(\tau)$ is defined as a function of $\tau$ according to the following formula.

(1)

$$N(\tau)=\frac{\int_{-T_1}^{+T_2} V(t)VR(t+\tau)dt}{\left[\int_{-T_1}^{+T_2}[V(t)^2dt\right]^{1/2}\left[\int_{-T_1}^{+T_2}[VR(t)]dt\right]^{1/2}}$$

where the limits of integration $-T_1$, $+T_2$ define the range of $t$ where neither $V(t)$ nor $VR(t+\tau)$ are zero. As a measure of identity between V and VR we take the value of $N(\tau)$ for $\tau=0$. For identity we have $N(0)=1$. Any departure from identity reduces $N(\tau)$. The particular case where $V(t)$ is reconstituted out of phase reversal carrier pulses that have been spread over a continuous distribution of transmission paths has been studied by the inventor in a short paper which derives explicit relations between the spread in transmission time and the reduction in $N(0)$ from 1. In particular it is to be noted that VR need not be the entire original $V(t)$, but in fact is useful as an analysis tool in (1) when it is any segment of the original $V(t)$ that includes the phase reversal (this segment may be termed a truncated replica). In particular one may contract it towards the interval $x \ldots x'$ of FIG. 3*b* and use it in (1) to exhibit as a function of $\tau$ the two correlation peaks, one positive for PR1 (phase reversal 1) and one negative for PR2 (phase reversal 2), as they are displayed in FIG. 10.

Clearly, in addition to its utility in the investigation of the heteorgeneity of the medium the phase reversals also provide a good way of placing information signals inside a carrier pulse. Reception is more or less faithful depending on how much greater is the amplitude of the correlation peaks than the spurious peaks generated by the noise of the medium.

Further examples of the utility of phase reversal carrier pulses and their analysis by truncated replica are illustrated in FIGS. 7 through 10, as follows:

FIG. 7*b* shows the extra resolving power gained by the truncated replica. When a medium is very heterogeneous and noisy, the distorted waveform would make it extremely difficult to pick out from all the side lobes the particular central phase reversal peak in 7*a* that occurs when $\tau=0$. This is important because the occurrence of this particular peak indicates the average arrival time of the sound wave packet. When it is identifiable, this time is measurable to a very small fraction ($\sim 1/30$) of a cycle. With ambiguity, the arrival time is uncertain by one or more entire cycles. On the other hand, with a replica that has been truncated to only a cycle (i.e., the interval $x \ldots x'$ of FIG. 3*b*), we get only one positive central peak bracketed by negative side lobes that occur at the ends of the entire carrier pulse. They are separated from the central peak then by half the pulse length and usually can cause no difficulty.

In FIG. 8 we have the case of two distinct transmission paths, sometimes called multipaths, which nevertheless have transmission times that are nearly equal. Specifically the difference is less than 2/3 of a cycle and still cross correlation with a truncated replica shows two distinct peaks separated exactly the distance they should be. Such a physical multi-path situation is very common in the ocean when transmitting over ranges greater than 20 nautical miles.

In FIG. 9 we have the case of a continuous spread of transmission paths with the spread being only .5 cycle and giving rise to a small diminution from 1 to .93 for the central correlation peak.

In the past, another useful waveform, now known as the chirp, was patented by Darlington (U.S. Patent No. 2,678,977). In principle, (3) one form of the chirp, upon cross-correlation with itself, also has the resolving power shown by truncated replica phase reversal system. However, there are several disadvantages to the chirp when its use is contemplated for underwater acoustic propagation:

(1) The total elimination of neighboring side lobes as shown in FIGS. 7 and 8 is impossible because there is no way of truncating the chirp replica to achieve this effect;

(2) In order for the resolving power demonstrated in FIG. 8 to be achieved, albeit with confusing side lobes, the chirp must be generated with a frequency sweep equal to several times the lowest frequency. This is physically impossible for acoustic transducers in the useful frequency ranges. On the other hand, an effective phase reversal can be generated in a single-frequency carrier pulse when very ordinary transducers are used;

(3) Even if in the future such transducers are feasible, one would still be unable to compose them in an array so as to have a directional source. The transducers used in the experiments on phase reversal carrier pulses are already in arrays and provide directional sources. In this connection it is interesting that the use of the chirp discussed by Klauder et al., "Theory and Design of Chirp Radars," Bell System Technical Journal, 39 (1960), 745, is confined to radar where it is possible to supply directionality with shaped reflectors. As yet, in underwater acoustics, at frequencies 100 to 100,000 c.p.s., this cannot be accomplished. There are however some marine animals who project directional sound by using part of their own flesh as a lens.

FIG. 1 illustrates a system for the generation of carrier pulses containing phase reversals. The output of a sine-wave oscillator 12 is fed to a pulse-forming means 14. The output of the latter is fed to a pulse phase-reversal means 16 which operates on the original carrier pulse to provide $\pi$-radian phase changes at selected points along the wave train of the carrier pulse. The transformed carrier pulse (which may be termed an interiorly phase-reversed pulse) is then fed to the transmitting means 18 which comprises amplifiers and transducers. The propagated pulse hits a target 17 and the echo is received and processed by conventional receiving means 19 and signal correlation means 21. This figure shows the system in terms of function.

The formation of the interiorly phase-reversed pulse 20 containing one phase reversal is shown by means of pulse envelope diagrams in FIG. 2*a*. The phase-reversal 22 is in the interior of the pulse 20 which is formed by adding two pulses, a relatively positive phase pulse 24 and a relatively negative pulse 26. If the time length of pulse 26 is T, then we have one phase reversal, 22, if (1) pulse 24 begins at a point $T_1$ later than the start of pulse 26 and (2) if the duration of pulse 24 is $T_2$ long, and $T_1+T_2=T$. In FIG. 2*b* the length, $T_2$, is made shorter and as a result we have two phase reversals, 23 and 25, one at a point $T_1$ and the other at a point $T_1+T_2$, both points being inside the interval T of pulse 20'. It is clear that this procedure is extensible so as to provide any arbitrary number of phase reversals inside the interval T.

The corresponding diagrams in sine-wave form are shown in FIGS. 3*a* and 3*b*. In FIG. 3*a*, sine-waves 28, 30 and 32 correspond to pulses 24, 26 and 20, respectively. In FIG. 3*b*, the sine-wave 33 corresponds to pulse 20' of FIG. 2*b* when the changes in $T_1$ and $T_2$ discussed above are made so as to cause (corresponding to 23 and 25) the phase reversals PR1 and PR2 to lie extremely close together (1 cycle apart). In this system it is apparent that the wave of shorter duration must be of greater amplitude than the other, can be as short as a half wave, should be an integral number of half waves for the greatest amplitude at the point of phase reversal, and can be situated anywhere within the period T so long as it is 180 degrees out of phase with the other wave.

Figure 4:
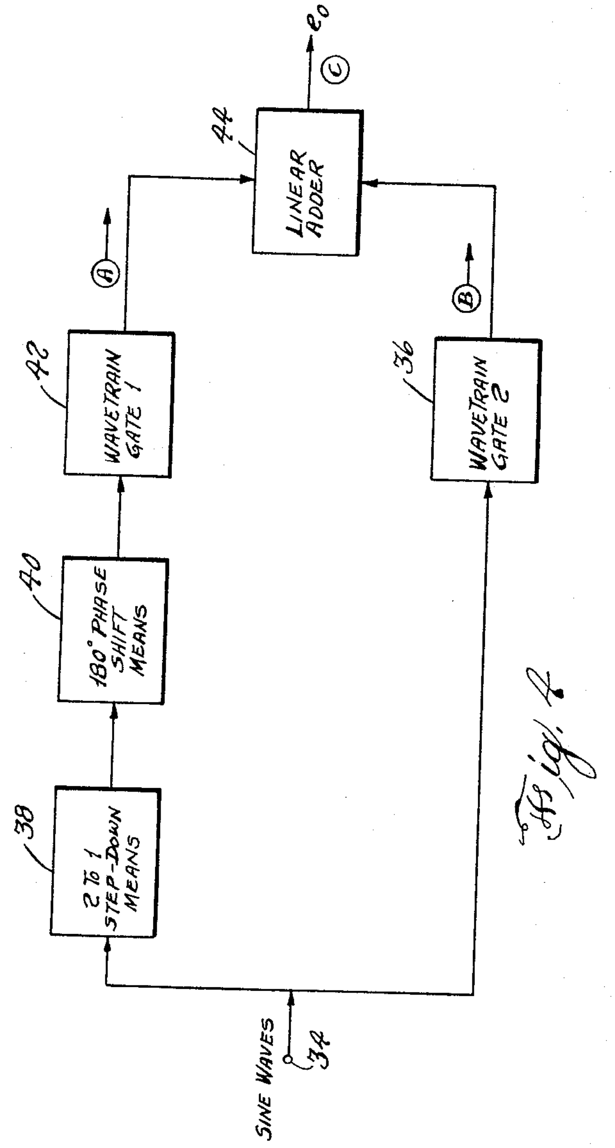
FIG. 4 is a block diagram showing a system for the automatic formation of a sine wave pulse having a single $\pi$-radian phase change in the center.

A possible automatic pulse-forming and phase reversing system is shown in block form in FIG. 4. From FIG. 3, it is clear that if a series of sine waves $e_1$ of duration $T_2$ is linearly added to a series of sine waves of half the amplitude and of duration T and beginning $T_1$ before $T_2$, the result is an output pulse consisting of a series of sine waves of half amplitude and duration T having at least one $\pi$-radian (180°) phase change at a point $T_1$ from the start of T. If $T_1+T_2=T$, that is the only phase change. If $T_1+T_2$ is less than T, there is a second phase reversal occurring at a point $T_2$ after the first.

A series of sine-waves is fed into the system at input terminal 34 and these waves travel along two paths. In the lower path, the continuous series of sine waves is passed through a wave train gate 36 which gives an output such as shown by wave B of FIG. 3, a pulsed sine wave of amplitude E and duration $T_2$. The wave train gate 36 is activated by counters so that $T_2$ begins at a time, $T_a+T_1$, measured from an external time marker. In the upper path, the input series of sine waves is decreased in amplitude by a factor of ½ in step-down means 38, is then shifted in phase by 180° by phase-shift means 40 and is then passed through a wave train gate 42 which limits its duration to a period T. Like 36, the wave train gate 42 is activated by counters but its durational period T begins at a time, $T_a$, measured from the same external time marker. The output of the upper wave train gate 42 is the wave A of FIG. 3*a*. Waves A and B are then fed to a linear adder 44, which may merely be a resistor adder network such as resistors 56, 58 and 60 shown in FIG. 5.

Figure 5:
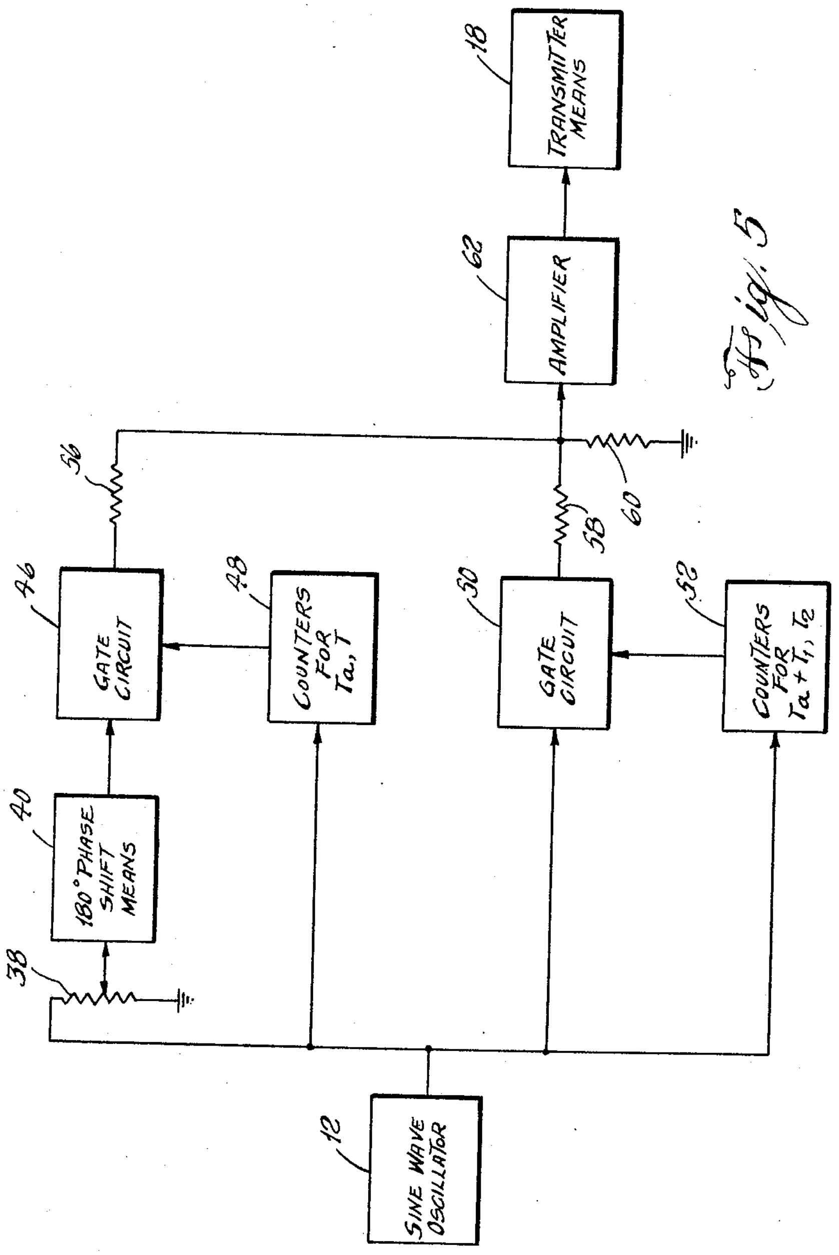
FIG. 5 is a schematic of an exemplary embodiment of the carrier pulse generating system wherein the counters are used to set $T_1$, $T_2$, and T.

FIG. 5 shows an embodiment of the complete system. The only difference here is that each wave-train gate, e.g., 42, of FIG. 4 is broken down into first a gate circuit 46 and counters grouped together as 48. The counter 48, which may comprise a unit such as the commercial Beckman-Berkley dual preset counter Model 5445, is set so that after $T_a$ it counts off a predetermined number of sine wave cycles and generates a rectangular pulse equal in duration to the duration of the predetermined number of sine wave cycles. The rectangular output pulse opens the gate circuit 46 so that the same number of sine wave cycles is permitted to pass through. Wave train gate 36 comprises the gate circuit 50 and counters grouped together as 52. Here the dual preset counter starts the pulse length counter after $T_a+T_1$.

Figure 6:
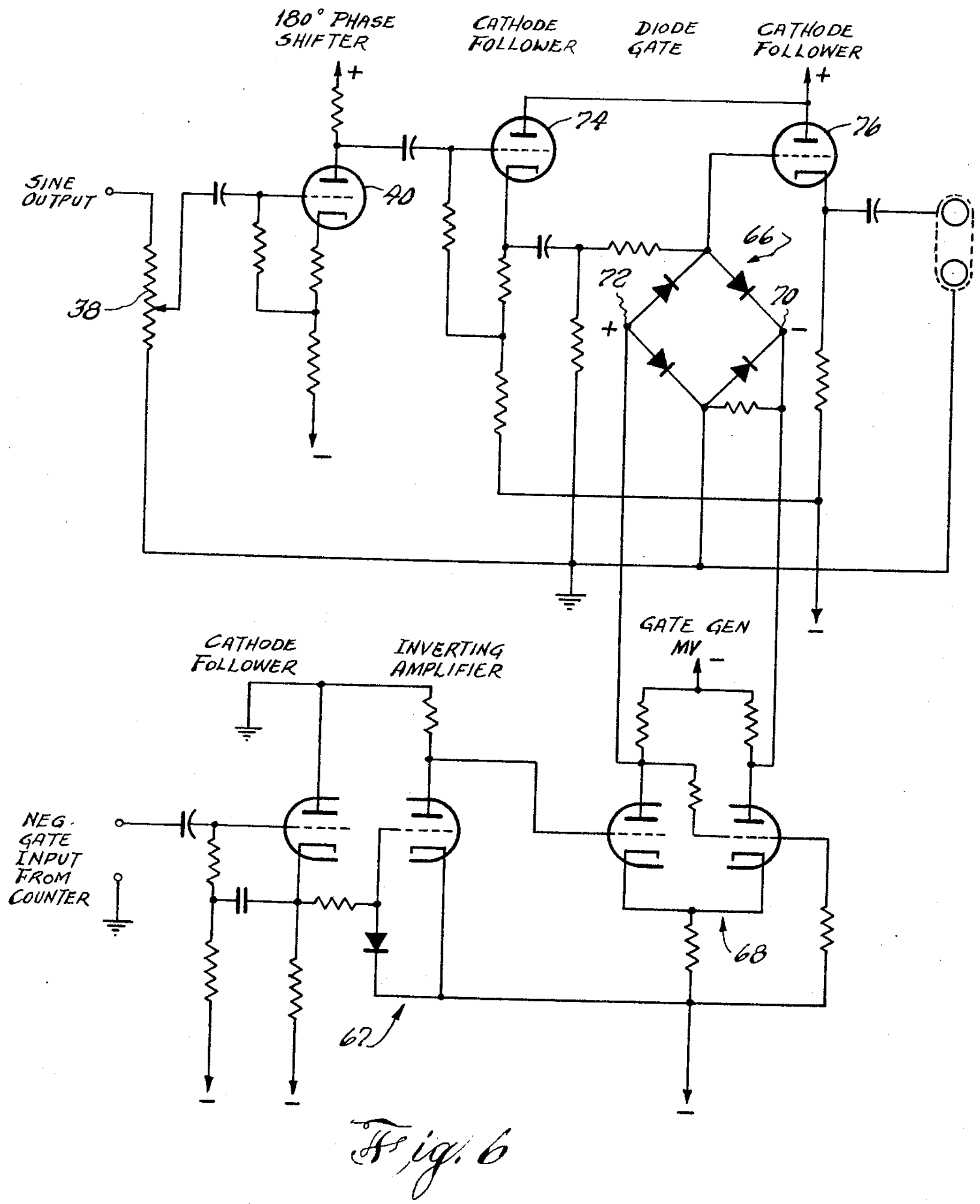
FIG. 6 is a schematic circuit diagram showing exemplary circuits which may be used for phase shifting and gating.

FIG. 6 is a schematic circuit diagram showing the pulse-forming means in greater detail. The circuits used here are conventional, and it is possible to use other circuits to accomplish the same results. The only comments which are necessary are the following:

(1) The gate circuit 46 comprises a set of diodes 66 in a bridge configuration and a multivibrator circuit 67. A negative gate input from the counter provides a rectangular output from the multivibrator 68 which makes point 70 of the set of diodes positive with respect to point 72. This permits the output of cathode follower 74 to be passed to the grid of cathode follower 76. In the absence of a negative gate input from the counter, the polarity of the output of the multivibrator 68 is such that the diodes conduct and short out the output of cathode follower 74.

(2) The lower gate circuit 50 of FIG. 5 includes only the multivibrator circuit 67, the cathode followers 74 and 76 and the diode configuration 66 of FIG. 6.

Obviously many modifications and variations of the present invention are possible in the light of the above teachings. It is therefore to be understood that within the scope of the appended claims the invention may be practiced otherwise than as specifically described.

I claim:

1. Apparatus for propagating an easily identifiable signal through a heterogeneous, noisy, unstable medium comprising, in combination:

means providing a first pulse of oscillatory energy;
means providing a second pulse of oscillatory energy, said second pulse being of shorter period than the first,
the amplitude of said second pulse being greater than the amplitude of said first pulse,
the phase of the oscillations of said second pulse being reversed 180 degrees relative to the phase of the oscillations of said first pulse, and
the durational period of said second pulse occurring within the durational period of said first pulse;
means for adding said two pulses together thereby forming an interiorly phase-reversed pulse of energy; and
means for propagating a replica of said phase-reversed pulse within said medium.

2. Apparatus as set forth in claim 1, wherein said oscillations are sinusoidal.

3. Apparatus as set forth in claim 1, wherein the amplitudes of the oscillations of each pulse are in the ratio of two to one.

4. Apparatus as set forth in claim 2, wherein the amplitudes of the oscillations of each pulse are in the ratio of two to one.

5. A method for providing an easily identifiable signal in a heterogeneous, noisy, unstable medium comprising the steps of:

generating a first pulse of oscillatory energy;
generating a second pulse of oscillatory energy, said second pulse being of shorter period than the first,
the phase of said second pulse being reversed 180 degrees relative to the phase of said first pulse,
the amplitude of said second pulse being greater than the amplitude of said first pulse,
the durational period of said second pulse occurring within the durational period of said first pulse;
adding said two pulses together, thereby forming an interiorly phase-reversed pulse of energy; and
propagating a replica of said phase-reversed pulse within said medium.

6. A method as set forth in claim 5, wherein said oscillatory energy is sinusoidal, the phase of the oscillations of said second pulse being reversed 180 degrees relative to the phase of the oscillations of said first pulse and the amplitude of the oscillations of said second pulse being greater than that of said first pulse.

7. A method as set forth in claim 6, wherein the amplitudes of the oscillations of each pulse are in the ratio of two to one.

8. A method for generating an echo ranging signal and identifying its echo reflected from a target located within a heterogeneous, noisy, unstable medium comprising the steps of:

generating a first pulse of oscillatory energy;
generating a second pulse of oscillatory energy, said second pulse being of shorter period than the first,
the phase of said second pulse being reversed 180 degrees relative to the phase of said first pulse,
the amplitude of said second pulse being greater than the amplitude of said first pulse,
the durational period of said second pulse occurring within the durational period of said first pulse;
adding said two pulses together, thereby forming an interiorly phase-reversed pulse of energy;
propagating a replica of said phase-reversed pulse within said medium;
receiving an echo signal reflected from said target and converting said echo signal into a corresponding electrical signal; and cross-correlating said corresponding electrical signal with a replica of the propagated pulse which includes a phase reversal.

9. A method as set forth in claim 8, wherein the replica against which said echo signal is cross-correlated is a truncated replica of at least one cycle containing a phase reversal.

References Cited

UNITED STATES PATENTS

| | | | |
|---|---|---|---|
| 2,778,002 | 1/1957 | Howry | 340—3 |
| 3,020,970 | 2/1962 | Hasbrook | 340—15.5 X |
| 3,268,860 | 8/1966 | Wischmeyer | 340—15.5 |

RICHARD A. FARLEY, *Primary Examiner.*